United States Patent [19]  [11] 4,355,909
Knudsen  [45] Oct. 26, 1982

[54] TEMPERATURE MEASUREMENT BY MEANS OF HEAT TUBES

[75] Inventor: Hans B. Knudsen, Copenhagen, Denmark

[73] Assignee: F. L. Smidth & Co., Cresskill, N.J.

[21] Appl. No.: 150,807

[22] Filed: May 19, 1980

[30] Foreign Application Priority Data

May 22, 1979 [GB] United Kingdom ............... 7917694

[51] Int. Cl.³ ............................................. G01K 1/16
[52] U.S. Cl. ................................................. 374/135
[58] Field of Search ............... 73/355 R, DIG. 7, 349, 73/362.8; 236/DIG. 12

[56] References Cited

U.S. PATENT DOCUMENTS

| 2,681,573 | 6/1954 | Brown ............................ 73/DIG. 7 |
| 3,095,743 | 7/1963 | Teasel et al. .................... 73/DIG. 7 |
| 3,138,025 | 6/1964 | Fingerson ....................... 73/DIG. 7 |
| 3,204,447 | 9/1965 | Krause et al. . |
| 3,247,714 | 4/1966 | Schwabe et al. ............... 73/DIG. 7 |
| 3,453,880 | 7/1969 | Dropkin et al. . |
| 3,808,889 | 5/1974 | Rawson et al. . |
| 4,067,237 | 1/1978 | Arcella ............................. 73/362.8 |
| 4,085,613 | 4/1978 | Richard . |

OTHER PUBLICATIONS

Braun, *Temperaturemessung mit kleiner Versugszeit etc.*, ATM Messtechnishe Praxis, vol. 476, Sep. 75, pp. R137–140.

*Primary Examiner*—S. Clement Swisher
*Attorney, Agent, or Firm*—Pennie & Edmonds

[57] ABSTRACT

A method and apparatus for measuring the temperature of hot fluids (1) in environments involving thermal radiation. The apparatus comprises at least one radiation-protected measuring body (4) constituting one end of a heat-tube (2) having a working temperature below the fluid (1) temperaure to be measured. The other end of the heat-tube (10) is connected to one end of a heat-conducting rod (8); the other end of which is kept cool by cooling means (11). The apparatus is equipped with temperature measuring means (12, 14) for measuring the temperature of the heat-tube as well as the temperature at two points along the heat-conducting rod. There can be more than one measuring body.

The method comprises: (1) protecting the measuring body against heat transfer by radiation; (2) measuring heat emission to a radiation-protected measuring body; (3) maintaining the radiation-protected measuring body at a substantially constant temperature which is below the temperature of the hot fluid; (4) measuring the temperature of the radiation-protected measuring body; and (5) calculating the temperature of the hot fluid by: (a) dividing the heat emission by the product of the heat transfer coefficient of the heat transfer between the hot fluid and the radiation-protected measuring body by the surface area of the measuring body, and then, (b) adding to that value the temperature of the measuring body. It is unnecessary to heat the measuring body to the temperature of the hot fluid. The method can be applied to measuring the temperature of gases in kilns.

16 Claims, 2 Drawing Figures

TEMPERATURE MEASUREMENT BY MEANS OF HEAT TUBES

TECHNICAL FIELD

The invention relates to a method of and apparatus for measuring the temperature of hot fluids or gases and is particularly useful in surroundings where there is thermal radiation. More particularly, this invention relates to measuring the temperature of kiln exit gases.

BACKGROUND ART

When measuring the temperature of hot gases at a temperature of at least about 1000° C., measurement will often be disturbed because the measuring body, apart from receiving heat from the hot gases, also receives or gives off some radiant heat depending upon the temperature of the surroundings, for example, in a kiln, from a heat source like a flame which heats the kiln. Consequently, the measuring body must be protected against heat transfer by radiation, for instance, by enclosing it in a polished mantle. However, it is difficult to find materials capable of maintaining a bright surface at the high temperatures to which the measuring body and the mantle are heated when measuring the temperature of hot fluids or gases. I have invented a method of measurement by which it is unnecessary to heat the measuring body to the temperature of the hot fluid or gas, the temperature of which is to be measured.

DISCLOSURE OF INVENTION

The present invention relates to a method for measuring the temperature of hot fluids, particularly in environments involving thermal radiation, comprising:

(1) protecting a measuring body against heat transfer by radiation;

(2) measuring heat emission to a radiation-protected measuring body;

(3) maintaining the radiation-protected measuring body at a substantially constant temperature which is below the temperature of the hot fluid;

(4) measuring the temperature of the radiation-protected measuring body; and (5) calculating the temperature of the hot fluid by:

(a) dividing the heat emission by the product of the heat transfer coefficient of the heat transfer between the hot fluid and the radiation-protected measuring body by the surface area of the measuring body, and then (b) adding to that valve the temperature of the measuring body, whereby the temperature of the hot fluid is measured so that it is unnecessary to heat the measuring body to the temperature of the hot fluid. The fluid can be a gas, and the method can be applied to measuring the temperature of gases in kilns.

The invention is also directed to an apparatus for measuring the temperature of hot fluids, particularly in environments involving thermal radiation, comprising at least one radiation-protected measuring body, constituting one end of a heat-tube, having a working temperature below the gas temperature to be measured, whereas the other end of the heat-tube is connected to one end of a heat-conducting rod, the other end of which is kept cool by a cooling means, which apparatus is equipped with temperature measuring means for measuring the temperature of the heat-tube as well as the temperature at two points along the heat conducting rod, whereby the temperature of the hot fluid is measured so that it is unnecessary to heat the measuring body to the temperature of the hot fluid.

According to the invention the object is achieved by taking a measurement representative of the heat transfer from a hot gas, preferably, to a radiation-protected measuring body, which is exposed to the hot gas and the temperature of which, during the measuring, is maintained at a known temperature substantially below the gas temperature to be measured. The temperature of the gas is calculated using the relationship $Q = hA (T_G - T)$, in which:

Q is the heat transfer per unit time, h is a conventional coefficient of heat transfer between the hot gas and the measuring body, A is the surface area of the measuring body, T is the temperature of the measuring body, and $T_G$ is the gas temperature to be measured. Temperature may be measured in degrees Kelvin, i.e. °K. or other convenient units.

Because the heat transfer coefficient h, is only determinable to a very uncertain and theoretical extent, it is expedient to arrange measurement in such a way that it is unnecessary to determine h in advance. This may be achieved by the case of two identical measuring bodies, that is, having essentially the same values for h and A, which are maintained at two different, but constant, known temperatures below the gas temperature to be measured, and thereby deriving the temperature of the gas without the need to know the values of h or A.

In this case the following relationships exist:

In this case the flowing relationships exist:

$$Q_a = hA (T_G - T_a) \text{ and } Q_b = hA (T_G - T_b),$$

in which:

$Q_a$ and $Q_b$ are the heats transferred to the respective measuring bodies per unit time, h is the coefficient of heat transfer between the hot gas and the respective radiation-protected measuring bodies, A is the surface area of each measuring body, $T_a$ and $T_b$ are the temperature of the respective measuring bodies, and $T_G$ is the gas temperature to be measured.

Because the two measuring bodies are identical, the quantity hA is the same in both equations, and consequently, can be eliminated. Because of the differing temperatures of the measuring bodies, there may be a minor difference in the heat transfer coefficient of the two measuring bodies. However, at the temperature occurring in practice, this difference is insignificant. The difference can be offset by using a conventional correction factor.

The measurement representative of the heat transfer to the or each measuring body may be a measurement representative of the heat flow through a known heat conductor, which conducts away from the measuring body the heat transferred to it from the gas. This representative measurement is appropriate for temperature measurement because the measuring body is maintained at a constant temperature and because the heat flow conducted away from the measuring body equals the heat flow transferred to it from contact with the hot gas.

The measurement representative of the heat flow through the known heat conductor may be obtained by taking a measurement of the temperature at two points along the heat conductor and use of the relationship $Q=(K/L) A_t (T_1-T_2)$ which:

Q is the heat flow per unit time,
K is the thermal conductivity of the heat conductor,
L is the distance between the two points of measurement,
$A_t$ is the cross-sectional area of the heat conductor, and
$T_1$ and $T_2$ are the temperatures measured at the two points.
Temperature can be measured in °K.

Another way to measure the heat transfer to a measuring body is to cool this body by making a cooling agent pass through it. The flow rate of the cooling agent may be regulated to keep the output temperature of the cooling agent from the measuring body constant which will reflect a constant temperature of this body. The heat flow from the measuring member can be found as the product of the flow rate of the cooling agent, the specific heat of the agent and the temperature difference between the cooling agent input and output of the measuring body.

The invention also includes an apparatus for carrying out the new method. The apparatus is characterized by at least one radiation-protected measuring body, constituted by one end of a heat tube, the working temperature of which is, in use, considerably below the fluid temperature to be measured. The other end of the heat tube is connected to one end of a heat conducting rod, the other end of which is kept cool. The apparatus is equipped with conventional temperature measuring means or devices for measuring the temperature of the heat tube as well as the temperature at two points along the heat conducting rod.

Fast distribution of the heat transferred to the measuring body is achieved by making the measuring body from a heat tube because the conductivity of a heat tube at its working temperature and higher temperatures is hundreds of times larger than that of commonly known solids. Thus, the entire heat tube will rapidly obtain approximately the same temperature as the measuring body. Where two measuring systems are used, it is expedient to employ two of the heat tubes, each with its respective heat conducting rod and temperature measuring devices, The two heat tubes have different working temperatures.

BRIEF DESCRIPTION OF THE DRAWINGS

Features of the present invention will be described in connection with FIG. 1 and FIG. 2 of the accompanying drawings.

BEST MODE FOR CARRYING OUT THE INVENTION

Figure 1:
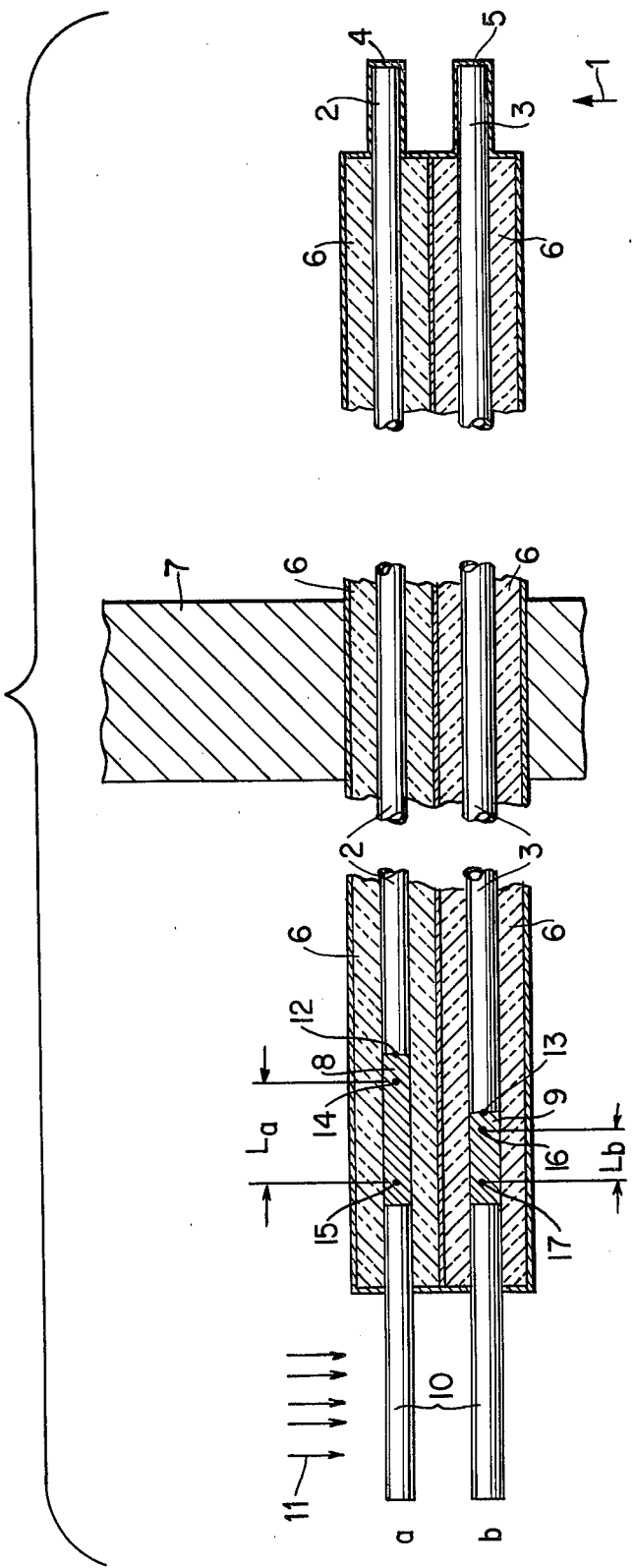
FIG. 1 is a schematic diagram of an apparatus for carrying out the method of the invention.

The gas, the temperature of which is to be measured, is represented by arrow 1. The gas is led past two geometrically identical measuring bodies. Each of the bodies includes the end of a conventional heat tube 2 and 3, respectively. Those tubes are protected by being equipped with a polished, known radiation-reflecting, heat transferring mantle 4 and 5, respectively. The remaining lengths of heat tubes 2 and 3 are insulated by means of an insulating mantle 6, and pass through kiln wall 7. At their opposite ends the heat tubes 2 and 3 are connected to heat conducting rods 8 and 9, respectively. The opposite ends of the rods, via two further heat tubes 10, are cooled by means of a known cooling agent, such as water, represented by arrows 11.

At the ends of heat tubes 2 and 3, which are connected to heat conducting rods 8 and 9, are located temperature measuring devices 12 and 13, respectively. On heat conducting rod 8 are located known temperature measuring devices 14, 15 spaced by predetermined distance $L_a$. Likewise, on heat conducting rod 9, are located known temperature measuring devices 16, 17 spaced by a predetermined distance $L_b$. The two heat tubes 2 and 3 are chosen to have different, but constant, working temperatures, considerably below the temperature to be measured, and can be fabricated by conventional methods using known materials.

The working temperature of a heat tube is determined by the heat transferring medium used in the tube. At and above working temperatures, the conductivity of the heat tube is hundreds of times larger than, for example, cooper. If more heat is passed to the "hot" end of the heat tube than is passed away from the "cold" one, the working temperature rises only a little, but the heat tube still retains its fine thermal conductivity. A constantly supplied heat excess will lead to destruction of the heat tube.

The heat tubes 2 and 3 may be chosen so as to have working temperatures of, for example, 400° C. and 150° C. The heat passed to the ends of the heat tubes inside the kiln must be dissipated at their opposite ends outside the kiln. This is done partly through the heat conducting rods 8 and 9, respectively, and partly through the two heat tubes 10 having a low working temperature, for example, 35° C. The heat tubes 10 are cooled by the cooling agent.

As the measuring bodies at the projecting ends of the heat tubes 2 and 3 are so designed as to have identical capacities of heat transfer, the heat flow in the heat tube 3, having the lower working temperature, will be larger than in the tube 2. Because the temperature drop along the heat conducting rod 9 should be smaller than the temperature drop along the heat conducting rod 8, the rod 9 should preferably be shorter than the rod 8. Because the two heat rods 10 are almost identical and cooled by the same cooling agent, the lowermost heat tube which is to conduct away a larger amount of heat, will operate at a somewhat higher working temperature than the uppermost heat tube.

If the temperature is measured at the points indicated by the measuring devices 12 and 13, the measured temperatures indicate the temperature of the measuring bodies located in the kiln. This is because the temperature of such parts of the heat tubes, which are outside the kiln, does not differ greatly from the parts which are inside the kiln, and consequently, from the temperature of the respective measuring bodies receiving heat from the hot gas. Because the heat tubes and the heat conducting rods connected to them are surrounded by insulation 6, heat is conducted away through the heat conducting rods 8, 9. The flow of heat through the individual rods can be determined by measuring the temperature at points 14, 15 and 16, 17, respectively, which are spaced at predetermined intervals. If the two measuring systems are called a and b, respectively, the desired exit gas temperature can be calculated from the following equation system:

$$Q_a = (K_a/L_a) A_{ta} (T_{14}-T_{15}) = hA (T_G-T_{12})$$

$$Q_b = (K_b/L_b) A_{tb} (T_{16}-T_{17}) = hA (T_G-T_{13})$$

in which:

$Q_a$ and $Q_b$ are the heat conducted away through the respective systems per unit time, $K_a$ and $K_b$ are the thermal conductivity of the material used for the rods 8 and 9, respectively, $L_a$ and $L_b$ are the distances between the temperature measuring devices 14, 15 and 16, 17, respectively, $A_{ta}$ and $A_{tb}$ are the cross-sectional areas of the rods 8 and 9 respectively, h is the heat transfer coefficient of the heat transfer between the hot gas, the temperature of which is to be measured, and the identical measuring bodies, A is the surface area of the measuring bodies, $T_{12}$, $T_{13}$, $T_{14}$, are the temperatures measured at $T_{15}$, $T_{16}$ and $T_{17}$ the points 12 through 17, and $T_G$ is the gas temperature to be determined.

When using the same material, same thermal conductivity and same cross-sectional area, with respect to the rods 8 and 9, the equations reduce to:

$$Q_a/Q_b = (L_b/L_a)((T_{14}-T_{15})/(T_{16}-T_{17})) = (T_G-T_{12})/(T_G-T_{13})$$

and the value of $T_G$ can readily be computed from a knowledge of $L_a$ and $L_b$ and readings of $T_{12}$, $T_{13}$, $T_{14}$, $T_{15}$, $T_{16}$ and $T_{17}$.

Figure 2:
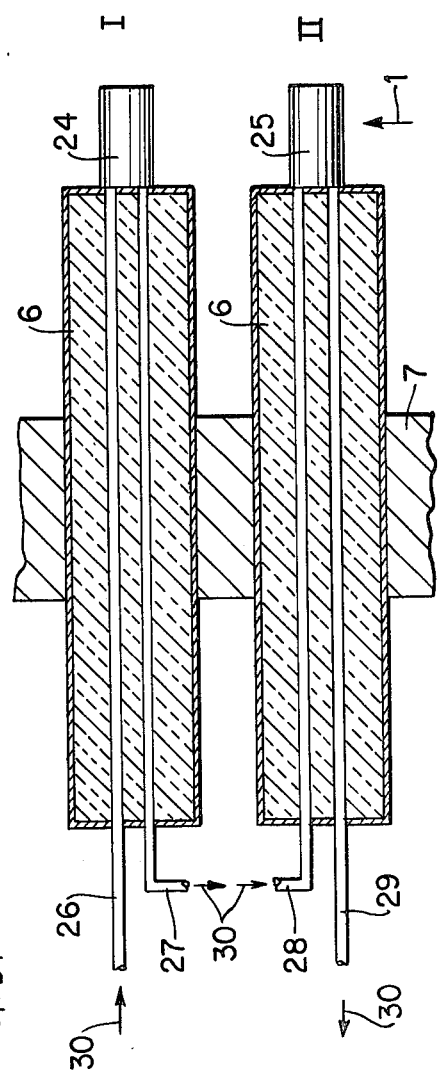
FIG. 2 is a schematic diagram of a second apparatus for carrying out the method of the invention.

The method according to the invention can also be carried out by an arrangement shown in FIG. 2.

In FIG. 2, two polished heat-reflecting, identical measuring bodies 24, 25 located in gas 1, the temperature of which is to be measured, are kept cooled at a temperature considerably below the gas. The measuring bodies are cooled by passing a liquid cooling agent through them. The heats conducted away from the measuring devices is calculated using the volume of fluid flowing through them, the specific heat of the cooling agent and the temperature difference between the cooling agent in the supply pipe and that in the return pipe. To make the two measuring bodies work at different temperatures, the cooling agent can be made to flow at different velocities through the measuring bodies, or the same flow of cooling agent can be used; the inlet temperature of the cooling agent to one of the measuring bodies should then be lower than the other body. This is conveniently achieved by coupling the two cooling circuits in series, in such a way that the return pipe of one of them constitutes the supply pipe of the other as shown in FIG. 2, in which 26, 28 are the supply pipes and 27, 29 are the return pipes of the respective measuring bodies. The arrows 30 indicate the flow of cooling agent. The cooling agent pipes are insulated from their surroundings and from each other in order to insure that the cooling agent temperature increase only derives from the heat conducted away from the measuring bodies.

The temperature of a measuring body can be said to equate with the temperature of the cooling agent returned from that measuring body. As a matter of fact, the temperature of the measuring body will lie a little above that value. This temperature difference can be determined by calibration of the temperature sensor or measuring device, and can be included in the calculations.

If the two measurment arrangements in FIG. 2 are designated I and II, respectively, the following equations appear when calculating the heat, which per unit of time, is passed to and conducted away from the respective measuring bodies:

$$Q_I = F_I \cdot V_{SI}(T_{27}-T_{26}) = hA(T_G-T_I)$$

$$Q_{II} = F_{II} \cdot V_{SII}(T_{29}-T_{27}) = hA(T_G-T_{II})$$

in which:

$Q_I$ and $Q_{II}$ are heat per unit time transferred through the respective systems, $F_I$ and $F_{II}$ are flow of cooling agent through the respective measuring bodies, $V_{SI}$ and $V_{SII}$ are specific heat of the cooling agent used in the respective systems, $T_{26}$, $T_{27}$, are the cooling agent temperatures $T_{28}$ and $T_{29}$ in the pipes 26, 27, 28 and 29, h is the heat transfer coefficient of the heat transfer between the hot gas, the temperature of which is to be measured, and the identical measuring bodies, A is the surface area of the measuring bodies, $T_G$ is the gas temperature to be determined, and $T_I$ and $T_{II}$ are the temperatures of the respective measuring bodies.

If the same cooling agent is used, and the same velocity of flow in the two measuring systems, which, for example, is the case if the two systems are coupled in series, $T_G$ can be calculated by the equation $$(T_{27}-T_{26})/(T_{29}-T_{28}) = (T_G-T_I)/(T_G-T_{II})$$

in which $T_I = T_{27}+C_I$ and $T_{II} = T_{29}+C_{II}$. $C_I$ and $C_{II}$ being correction quantities which can be calculated by calibration. Furthermore, if the measuring systems are coupled in series $T_{27}=T_{28}$.

In this specification, the preferred application of the invention has been described, that is, for measuring the temperature of hot gases. But, the invention is equally applicable for other fluids. Accordingly, it will be appreciated that the preceding description of the preferred application of the invention is not intended to limit the invention.

I claim:

1. A method for measuring the temperature of hot fluids, particularly in environments involving thermal radiation, comprising:

(1) taking a temperature measuring device having at least two measuring bodies, each measuring body being capable of maintaining a substantially uniform temperature over its length;

(2) protecting said measuring bodies against heat transfer by radiation;

(3) positioning said measuring bodies in the hot fluid environment;

(4) maintaining said radiation-protected measuring bodies at substantially constant, differing temperatures, which temperatures are below the temperature of the hot fluid and are generally uniform over the lengths of said measuring bodies;

(5) calculating the temperature of the hot fluid by:

(a) dividing the heat emission to each radiation-protected measuring body by the product of (1) the heat transfer coefficient of the heat transfer between the hot fluid and said body and (2) the surface area of the respective measuring body, and then, (b) adding to that value the temperature of the respective measuring body, whereby it is unnecessary to heat said measuring body to the temperature of the hot fluid.

2. The method according to claim 1, wherein the fluid is a gas.

3. The method according to claim 1 wherein said measuring bodies have substantially identical heat transfer coefficients and surface areas, and the gas temperature is calculated using the equations $Q_a=hA(T_G-T_a)$ and $Q_b=hA(T_G-T_b)$, in which:

$Q_a$ and $Q_b$ are the heat emission to the respective radiation-protected measuring bodies per unit time;

h is the heat transfer coefficient of the heat transfer between the hot gas and the respective radiation-protected measuring bodies;

A is the surface area of the measuring bodies;

$T_a$ and $T_b$ are the temperatures of the respective measuring devices; and $T_G$ is the gas temperature desired.

4. The method according to claim 1 including calculating heat emission to the radiation-protected measuring body by measuring at constant measuring body temperature heat flow through a known heat conductor having a predetermined terminal conductivity and cross-sectional area, which conducts away heat given off to the radiation-protected measuring body.

5. The method according to claim 4 including calculating heat flow through known heat conductor by measuring the temperature at two points along the heat conductor, multiplying the difference between those two temperatures by the cross-sectional area of the heat conductor and the thermal conductivity of the heat conductor divided by the distance between the two points at which the two temperatures are measured.

6. The method according to claims 2 or 1 including measuring heat emission to the radiation-protected measuring body by keeping the measuring body temperature constant by cooling with a stream of cooling agent through the measuring body, whereby the heat emission is calculated as the product of the flow rate of the cooling agent, the specific heat of the agent and its rise in temperature.

7. An apparatus for measuring the temperature of hot fluids, particularly in environments involving thermal radiation, comprising at least two radiation-protected measuring bodies each constituting one end of a heat-tube being capable of maintaining a substantially uniform temperature over its length, each heat tube, having a working temperature below the fluid temperature to be measured, wherein the other end of the heat-tube is connected to one end of a heat conducting rod, the other end of which is kept cool by cooling means, which apparatus is equipped with temperature measuring means for measuring the temperature of the heat-tube as well as the temperature at two points along the heat conducting rod, whereby the temperature of the hot fluid is measured so that it is unnecessary to heat the measuring body to the temperature of the hot fluid.

8. The apparatus according to claim 7 (a) two measuring bodies having substantially identical heat transfer coefficients and surface areas, with appertaining heat-tubes, heat conducting rods, said measuring bodies having substantially identical thermal conductivities and cross-sectional areas, said heat tubes having different, but constant working temperatures, and (b) temperature measuring means.

9. The apparatus according to claim 8 wherein the heat conducting rods in the two measuring systems are of unequal size and the rod in the measuring system with the heat-tube having the lower working temperature is the shorter rod.

10. The apparatus according to claim 7 wherein the measuring body has a polished mantle.

11. The apparatus according to claim 7 used in a kiln.

12. The apparatus according to claim 7 wherein the other end of the heat tube is insulated.

13. A method for measuring the temperature of hot gases, particularly in environments involving thermal radiation, comprising:

(a) positioning two measuring bodies in the hot gaseous environment, each measuring body being capable of maintaining a substantial uniform temperature over its length;

(b) protecting the measuring bodies against heat transfer by radiation;

(c) measuring heat emission to said radiation-protected measuring bodies;

(d) maintaining said radiation-protected measuring bodies, having substantially identical heat transfer coefficients and surface areas, at different constant temperatures which are substantially below the temperature of the hot fluid;

(e) measuring the temperature of the respective radiation-protected measuring bodies, the temperature being generally uniform over each measuring body; and (f) calculating the gas temperature using the equations $Q_a=hA(T_G-T_a)$ and $Q_b=hA(T_G-T_b)$, in which:

$Q_a$ and $Q_b$ are the heat emission to the respective radiation-protected measuring bodies per unit time;

h is the heat transfer coefficient of the heat transfer between the hot gas and the respective radiation-protected measuring bodies;

A is the surface area of the measuring bodies;

$T_a$ and $T_b$ are the temperatures of the respective measuring devices; and $T_G$ is the gas temperature desired;

whereby the temperature of the hot fluid is thus measured so that it is unnecessary to heat the measuring bodies to the temperature of the hot fluid.

14. An apparatus for measuring the temperature of hot fluids, particularly in environments involving thermal radiation, comprising at least two identical elongated radiation-protected measuring bodies, each body being capable of maintaining a substantially uniform temperature over its length, each body having a working temperature below the fluid temperature to be measured, which apparatus is equipped with supply pipes and return pipes through which a cooling agent flows for maintaining said measuring bodies at substantially constant, differing temperatures.

15. An apparatus for measuring the temperature of hot fluids, particularly in environments involving thermal radiation, comprising at least two identical elongated radiation-protected measuring bodies, each body constituting a heat-reflecting tube, having a working temperature below the fluid temperature to be measured, which apparatus is equipped with supply pipes and return pipes through which a cooling agent flows and wherein the return pipe of one of the measuring bodies constitutes the supply pipe of the other measuring body.

16. The apparatus according to claim 15 used in a kiln.

* * * * *

UNITED STATES PATENT AND TRADEMARK OFFICE
CERTIFICATE OF CORRECTION

PATENT NO. : 4,355,909
DATED : October 26, 1982
INVENTOR(S) : Hans B. Knudsen

It is certified that error appears in the above—identified patent and that said Letters Patent is hereby corrected as shown below:

In the abstract, line 6

"(1) temperaure"

should read:

--(1) temperature--.

Column 2, line 24

"by the case of"

should read:

--by the use of--.

Column 2, line 33

Delete the sentence,

"In this case the flowing relationships exist:"

UNITED STATES PATENT AND TRADEMARK OFFICE
CERTIFICATE OF CORRECTION

PATENT NO. : 4,355,909
DATED : October 26, 1982
INVENTOR(S) : Hans B. Knudsen

It is certified that error appears in the above-identified patent and that said Letters Patent are hereby corrected as shown below:

Column 4, line 23

"cooper"

should read:

--copper--.

Column 7, line 25

"terminal"

should read:

--thermal--.

Signed and Sealed this

Twenty-fifth Day of January 1983

[SEAL]

Attest:

GERALD J. MOSSINGHOFF

Attesting Officer

Commissioner of Patents and Trademarks